CONTINUOUS MOTION PICTURE TRANSMITTING APPARATUS

Filed April 15, 1952 3 Sheets-Sheet 1

INVENTOR.
JOHN C. KUDAR
BY Lynn H. Latta
ATTORNEY

CONTINUOUS MOTION PICTURE TRANSMITTING APPARATUS

Filed April 15, 1952

3 Sheets-Sheet 2

INVENTOR.
JOHN C. KUDAR
BY Lynn H. Latta
-ATTORNEY-

Feb. 21, 1961 J. C. KUDAR 2,972,280

CONTINUOUS MOTION PICTURE TRANSMITTING APPARATUS

Filed April 15, 1952 3 Sheets-Sheet 3

INVENTOR.
JOHN C. KUDAR
BY
Lynn H. Latta
ATTORNEY

United States Patent Office 2,972,280
Patented Feb. 21, 1961

2,972,280

CONTINUOUS MOTION PICTURE TRANSMITTING APPARATUS

John C. Kudar, Hollywood, Calif.
(2584 E. Cartwright Road, Honolulu 15, Hawaii)

Filed Apr. 15, 1952, Ser. No. 282,293

4 Claims. (Cl. 88—16.8)

This invention relates to continuous motion picture transmitting apparatus. The invention may be usefully applied to a motion picture camera, to a motion picture projector, or to the scanning of motion picture film for transmission into a television broadcasting circuit. Another useful application of the invention is in connection with motion picture photography from a television or radar screen, i.e., in the operation of special motion picture cameras for photographically recording televised or radar transmitted pictures. In this connection, the invention deals with a particular problem in the photographing of televised pictures, raising from the difference in frame repetition frequencies of conventional televised pictures (60 frames per second) and conventional motion picture photography and projection (24 frames per second).

The term "transmitting apparatus" is adopted herein to embrace all such possible applications as well as other analogous applications that may later suggest themselves. The term "continuous" is used to denote a non-intermittent operation, departing from the intermittent shutter operation involved in conventional motion picture photography and projection. The invention eliminates the conventional mechanism for arresting the movement of a motion picture film through a camera or projector, so as to hold each picture frame stationary while light is being projected therethrough for exposing the picture or for projecting the picture on a screen, as the case may be. In place of such conventional intermittent shutter and drive mechanisms, the invention provides for immobilizing the potical image of each frame of the picture while it is continuously travelling past the light beam which intersects the film. By optical immobilization, I mean the displacement of the light beam in such a manner that the portion of the beam coming from the subject in the case of a camera taking a picture, or the portion of the beam extending from the projector to the screen in the case of motion picture projections, is held rigidly stationary, centered at the optical axis of exposure or projection respectively, while the portion of the beam which is immediately adjacent the intersecting film, is optically displaced so as to move in synchronism with the movement of the film.

It is known that optical immobilization of a more or less limited precision can be attained by the use of a rotating polygonal prism, interposed in the light beam in such a manner as to produce a refraction of the light ray as it enters the prism and again as it leaves the prism, thereby bodily offsetting or displacing a section of the beam within the apaparatus, while maintaining the displaced section parallel to the stationary portion of the beam, the displaced section of the beam being the portion that directly intersects the film, and the displacement being of a progressive nature such that displaced portions of the beam continually move in exact synchronizm with the moving film. In order that parallelism of the stationary and displaced portions of the beam may be obtained, the prism is of a type having parallel, diametrically opposed facets, so that the beam is refracted to the same extent upon entering and leaving the prism.

In known non-intermittent motion picture apparatus of the polygonal prism type, there is a gearing mechanism between the rotating prism and the continuously moving film, for transmitting movement between the two. Such a gearing mechanism in the central part of the appaartus has an inherent drawback, in that it may cause inaccuracies in the synchronization of prism facets and film frame. This will be apparent from the fact that any bearing mechanism must necessarily embody a measurable amount of backlash or play in the interengaging elements thereof. A belt drive of course cannot be used for the reason that it is inherently subject to slippage which would destroy synchronism.

With the foregoing in mind, the general object of this invention is to provide a continuous motion picture transmission apparatus which will achieve optical image immobilization in a more satisfactory manner than has been possible with known conventional devices of this general nature. In general, this is achieved by simplification of the mechanical structure of the apparatus so that the need for a geared drive between the rotating prism and the film advancing mechanism, is eliminated.

A further object of the invention is to provide an apparatus of this general nature, having relatively simple means for adjusting the same in a manner to adapt the apparatus to any degree of film shrinkage. This provision is desirable, and indeed necessary, in the case of motion picture projection and of television film transmission, and it is convenient to employ such adjusting means even in cameras for the purpose of high speed motion picture protography or motion picture photography from television or radar screen, in order to eliminate any necessity for manufacturing precision with respect to the length of the beam path through the optical system of the apparatus.

In general, the foregoing objects are attained by utilizing a composite polygonal prism including a rotating outer component and a stationary inner component or components. All such components may have the same refractive index, although some of the inner stationary components may preferably have refractive indices different from the refractive index of the outer component. The latter is of annular form, with the stationary components arranged therewithin. The external surface of the annular outer component is in the form of a polygonal prism, while the internal surface thereof is of concave circular cross-section (e.g. cylindrical). Such concave internal surface is separated by a thin air meniscus from a similar convex surface of the adjacent stationary inner component. There are two of such air menisci, one between the rotational axis of the optical device and the projection lens (or camera lens) and the other between said axis and the film. Preferably, such menisci (which may be cylindrical, conical or spherical) are designed as meniscus lenses of zero power. This can be achieved by utilizing slightly different radii of curvature for the two adjacent surfaces of the optical components, providing that both parts (i.e. the annular rotating component and the stationary internal component or components) are made of the same material (e.g. optical glass i.e. of the same refractive index). Alternatively, the internal surface of the rotating annular component and the corresponding curved surface of the adjacent stationary component can be made precisely coaxial, provided that the refractive indices of the respective components have a corresponding slight difference.

Other objects will become apparent in the ensuing specifications and appended drawings in which.

Figures 1, 1A, 1B, 1C, 2, 3:
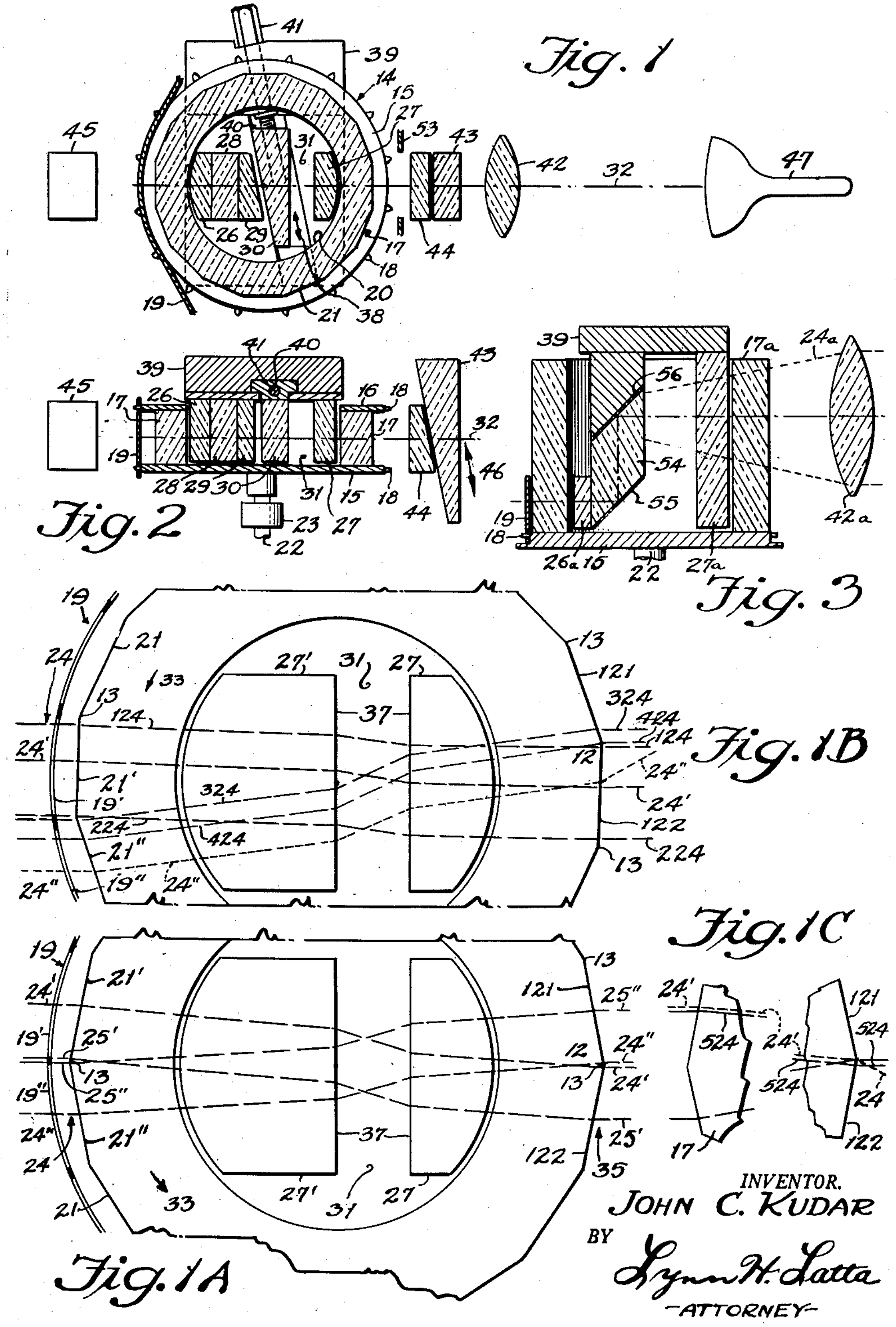
Fig. 1 is a cross sectional view of a combined film drive and light beam displacing mechanism embodying one possible form of the invention.
Figs. 1A and 1B and 1C are schematic diagrams illustrating progressive stages of light beam displacement in the operation of the apparatus of Fig. 1.
Fig. 2 is a sectional view of the same apparatus in the plane defined by the optical and rotational axes thereof.
Fig. 3 is a sectional view, in a similar plane, of a modified form of the invention.

In general, the accompanying drawings show the arrangement of optical components and associated drive units, but omit frames, fittings, and other conventional elements, all of which can be supplied in obvious ways, without the necessity for the use of invention in doing so, and consequently form no part of the present invention.

In general, my invention utilizes a single rotating unit which serves the double function of a film sprocket for advancing the perforated film and an optical immobilizer for maintaining registration of the film and the image carried by the light beam. Apart from this central mechanism, all other portions of the complete apparatus embodying the invention, may be derived from merely routine designing and assembling practice, and as such, do not constitute a necessary or essential part of this invention.

Referring now to the drawings in detail, I have shown, (in Figs. 1 and 2) as an example of one form in which the invention may be embodied, a combined film sprocket and light beam deflecting element 14 comprising a pair of discs 15 and 16 and an annular polygonal prism 17 interposed between and secured thereto. Sprocket teeth 18 are formed on the respective peripheries of one or both of discs 15, 16, for driving the perforated film 19. The annular polygonal prism 17 has an inner surface 20 of continuous uniform curvature, of circular cross section, and is preferably cylindrical, though it may be conical or spherical. Prism 17 has a peripheral surface defined by a series of facets 21 which are flat, are of uniform circumferential dimension and spacing, and are disposed in planes parallel to the axis of rotation of the rotatable unit 14. Rotatable unit 14 is mounted on any suitable means, such as a shaft 22, for rotation on a fixed axis in suitable bearing means, indicated at 23.

It will now be apparent that, with the film drive sprocket and rotating prisms combined in a single integral unit, the succeeding frames of the picture on the film 19 may be maintained in absolute registration with the facets 21, so that the image produced by the light beam passing through each succeeding frame will be deflected in exactly the same manner as for the preceding frame.

Referring now to Fig. 1A, it will be apparent that a pair of parallel rays 24′, 24″ of a light beam 24 being projected through adjacent frames 19′, 19″ of the film 19, as they enter the prism 17 through the adjacent facets 21′, 21″ beneath the respective picture frames 19′, 19″, will be refracted toward each other as indicated by the broken line continuations of rays 24′, 24″, through the near side of prism 17. At this point it may be noted that, to facilitate the explanation of the operation of the invention, the rays 24′, 24″ are indicated as the rays passing through the centers of the respective frames 19′, 19″, and therefore designate identical points in the picture displayed on the successive frames. In passing through the prism, these rays are converged just enough to substantially meet as they leave the opposite side of the prism. It will also be apparent that in passing out of the prism at said opposite side, they will be refracted in the opposite direction from the direction of refraction as they enter, so as to proceed substantially as a single ray, parallel to the entering rays 24′, 24″.

Theoretically, by selecting, for the body of the prism 17, a material having a suitable refractive index, it should be possible to obtain the desired displacement of the two rays in a solid, integral prism body. However, as I will explain more fully hereinafter, this would require a relatively high refractive index, and since materials of a lower index are more suitable from other standpoints, and for other reasons which will be explained, I prefer to increase the displacement in the center of the prism through the use of stationary refractive elements which preferably include a series of elements such as the optical elements 26, 27, 28, 29 and 30 of Fig. 1. Also, to obtain the desired increase in displacement of the rays, an air gap 31 is included between two of these refractive elements. With reference to Fig. 1A, which for simplicity of illustration, shows only a pair of inner refractive elements, designated 27 and 27′ (the latter representing the series of elements 26, 28, 29, 30) it may be noted that the beams 24′, 24″, continued through element 27′, are refracted to increase convergence in air gap 31, so as to obtain a greater displacement for a given extent of travel diametrically across the optical assembly. As they enter the element 27, they are refracted to their initial angle of convergence. These portions of the beam continue through the adjacent portion of the prism 17 to the point 12, where they come together.

Returning now to the consideration of the light beam as it enters the optical displacement system, the two lines 25′, 25″ indicate rays passing through adjacent extremities of the respective frames 21′, 21″, and these rays are displaced in parallelism with the central rays 24′, 24″, as indicated by the broken lines crossing each other and diverging as the rays 24′, 24″ converge, and emerge from the opposite side of the displacement assembly, in reversed relation and in alignment with rays 24″, 24′ respectively.

It may now be noted that light beam 24, in passing through the displacement assembly, is split into two bundles of rays one bundle being defined between rays 24′, 25′ and the other between rays 24″, 25″. These partial beams cross other in traversing the prism 17, and are reassembled and merged at point 12 to constitute an emitted beam 35.

Assuming a counter clockwise rotation as indicated by arrow 33, and assuming that rays 24′, 24″ shift bodily downwardly to maintain their registration with the respective centers of frames 19′, 19″ (this assumption is made merely to facilitate the explanation of operation, it being understood that the bundles of rays do not actually shift and that the assumed shifting of rays 24′, 24″ is actually the successive replacement of one ray for another in the bundle of light rays), it will now be apparent that as ray 24′ and all other rays entering the prism above facet dividing edge 13—e.g. rays 124 and 224, shifts downwardly, its displacement will be gradually lessened, whereas the ray 24″ (and all other rays entering the prism below 13—e.g. rays 324 and 424) as it shifts downwardly will have its displacement gradually increased. It may now be noted that the image forming beam 35 leaving the prism is composed of a wide beam section embraced between rays 124, 224 and a narrow beam section embraced between rays 324, 424, and that the point 12 where these beam sections become parallel and unite as a single beam upon leaving the prism, has remained adjacent facet dividing edge 13.

At this point, it should be noted that the ray 24″, which in Fig. 1A leaves the prism through facet 121 above this edge 13, will, as soon as, it passes below the edge 13, be refracted off at an angle such as to form no part of the image leaving the prism. Accordingly, in any downward shift below the position shown in Fig. 1A, only the ray 24′ of the two rays 24′, 24″ will actually leave the prism to become a part of the transmitted image. This is illustrated in Fig. 1B, wherein ray 24″, in the transition from Fig. 1A to Fig. 1B, has shifted across edge 13 so as to leave through facet 122 in Fig. 1B instead of through facet 121, as in Fig. 1A and its angle of refraction as it leaves facet 122, as indicated in dotted lines, is such that the ray leaves the line of vision and is not included in the image forming beam.

In a manner analogous to the elimination of the emitted portion of ray 24″ as it crosses an edge 13, the ray 24′ will not commence to become visible as an emitted ray until it crosses from above to below the prism edge 13. This is illustrated in Fig. 1C, wherein the prism 17 is shown in a position of rotation slightly preceding the position of Fig. 1A, and wherein ray 24′ leaves the prism through facet 121 and is therefore deflected downwardly out of the image beam, as indicated, whereas a slightly lower ray, illustrated at 524, leaves the prism through the succeeding facet 122 and is therefore refracted parallel to the optical axis, as part of the image beam.

It will now be apparent that the emitted light beam will carry a stationary image composed of a bundle of stationary light rays constituting extensions of two bundles of light rays one entering through an upper frame 19′ and an upper facet 21′, gradually straightening out, and leaving through a lower facet 122 so as to constitute the lower half of the emitted beam 35, and a second bundle of light rays entering through a lower frame 19″ and a lower facet 21″, being increasingly displaced, and leaving through upper facet 121 so as to constitute the upper half of the emitted beam 35. It will further be apparent that at the center of the emitted light beam, an upper beam 24″ derived from the lower portion of beam entering beam 24, is constantly vanishing and is being replaced by an appearing lower beam 24′, derived from the beginning or upper portion of the entering beam 24.

Considering now the downward movement of the light rays 25′, 25″, defining the limit of adjacent frames, as the prism 17 rotates counterclockwise, it will be apparent that the light ray 25′, passing through facet 21′, as a facet 21 approaches the perpendicular, will have its displacement gradually lessened so that, as the entering portion of the ray reaches the level of the lower side of the emitted beam 35, it will be aligned with the emitted portion of the ray.

The net effect is a stationary image carried by the emitted beam 35 derived from the adjacent half images produced by the passage of the beam 24 through the adjacent portions of succeeding frames of the film. There will be a continuous merging of the image derived from one frame with that derived from the succeeding frame, in the emitted beam 35, so as to produce a continuously moving picture, completely devoid of flicker, and completely devoid of any interruption of the light beam carrying said picture. Thus the advantages of this type of picture transmission includes not only the elimination of complicated and troublesome intermittent drive mechanism, but also a greatly improved use of the available light and an infinitely improved effect on the human eye, through the elimination of flicker.

Having reviewed the basic theory of operation of the invention, I will now proceed to the description of the improvements provided by the invention.

As previously pointed out, by using a beam displacing assembly comprising both rotating and stationary components, it becomes possible to select a material of optimum qualities, from an optical standpoint, without regard to the necessity for proper coordination between the diameter of the prism and the index of the refraction of the material, in order to obtain exactly the correct amount of optical displacement of the light rays. At this point it may be noted that the basic stationary optical elements 27 and 27′ are, in effect, plano-convex cylindrical lenses, in order to provide parallel, spaced flat faces 37 defining an optical air space 31, the width of which is selected so as to attain the desired extent of increased displacement.

Returning now to Fig. 1, the plano-convex cylindrical lenses 26, 27 may be of the same material and same refractive index as prism 17. For chromatic correction, an additional stationary optical component 28 in the form of a plane-parallel plate 28, may be utilized.

The additional inner components 29, 30, in the form of wedges one of which is shiftable transversely of the optical axis of the assembly, are utilized for varying the effective optical diameter of the assembly, i.e. for varying the width of the optical air space 31. It will be apparent that a change in the width of space 31 will vary the amount of additional displacement of the light rays traversing the space. Such adjustment is utilized for obtaining accurate registration of the coinciding emitted rays 24, 24′. Such adjustment becomes necessary as the result of shrinkage and elongation of the film, varying the height of the individual frame. For example, shrinkage will bring the entering rays 24′, 24″ closer together, so that the emerging portions of these rays would actually cross each other and be displaced from registration at the center of the emitted image. By decreasing the amount of displacement within the optical assembly, the emitted central rays can be brought back to proper registration. In Fig. 1, the optical element 30 may be considered as being mounted for shifting movement as indicated by arrow 38. A slidable connection between element 30 and a support 39, is therefore indicated in Fig. 2, at 40. An adjusting screw, for adjusting the element 30 relative to support 39, is indicated at 41 in Fig. 1. The remaining fixed optical elements 26, 28, 29 and 27 may be secured fixedly to support 39, and extend through a central opening in disc 16, which is annular.

Other components of the optical system may include a lens 42, a pair of optical wedges 43 and 44, and an element 45 which may be a projection lamp, a photocell, etc. Adjustment of wedge 43, as indicated by arrow 46, is utilized to restore the optical length of the entire assembly to its proper value to compensate for disturbance thereof by the shifting of wedge 30 (refocusing). The readjustment of the optical length by means of wedge 43 is preferable to refocusing by an axial shift of lens 42, particularly in the case of film scanning for television transmission, e.g. the projection of a flying spot beam 32 from a cathode ray tube 47 through the optical system and through the film 19 onto element 45 (in this case a photocell), for picking up and transmitting the variations in light intensity.

Two pairs of compensating wedges are bound to cause some astigmatism, proportional to the square of the angle of incidence. The astigmatism of these two gaps may be made equal but of opposite sign, so that they compensate each other, if the planes of incidence are not parallel, but subtend at an angle 90° around the optical axis. Accordingly, Figs. 1 and 2 indicate the wedges 30 and 43 respectively with the longitudinal axes disposed at right angles to each other.

In the case where the lens 42 is not adapted to be adjusted for refocusing in connection with shrinkage compensation, the pair of wedges 43, 44 may be eliminated. Compensation for astigmatism in such a case may be provided for by utilizing two pairs of wedges inside the polygonal prism 17, with the longitudinal axes thereof disposed at 90° apart around the optical axis.

A continuous picture transmitting apparatus such as that described above, may be used for different purposes. Where it is used for motion picture projection, the projector lamp and condensor lens may be represented by the part 45 of Figs. 1, 2. The part 45 is eliminated where the invention is embodied in a motion picture camera, e.g. a high speed film camera. In the particular case of taking motion pictures from a television receiver screen or radar screen, the cathode ray tube 47 is arranged at a suitable distance from the lens 42, in order to photograph the fluorescent screen thereof onto the light sensitive film 19. In the special case of television film scanning, the cathode ray tube, which in this case may be considered as being represented at 47, constitutes a flying spot scanner, with the image of its screen projected by lens 42 through the optical system 14 onto the light sensitive film 19 (e.g. positive film, such as is used for projection purposes). Behind this film is a photoelectric cell, in this case represented by part 45, arranged, together with a light gathering light system, between the film 19 and the photoelectric cell.

For the optical arrangement shown in Figs. 1 and 2, there is required a material of high refractive index, about 1.6 (e.g. crown glass or high index rare earth glass, which are preferable materials). Other components of the inner assembly, such as the plate 28 and the pairs of inner wedges, may be made of high dispersion glass, in order to introduce chromatic correction.

The optical path through the composite polygonal prism, which consists of a rotating component of polygonal periphery, and of stationary inner components, is represented by the sum of the following thicknesses of the different optical media:

$T_1$ is the total thickness of the following glass components: the polygonal ring, and the two stationary (e.g. cylindrical) lenses, having the same refractive index $n_1$;

$T_2$ is the total thickness of the other inner glass components with the refractive index $n_2$;

$T_3$ is the total thickness of all air gaps along the optical path between opposite facets of the polygonal prism, including the two air menisci (e.g. cylindrical air menisci) between the inner surface of the polygonal ring and the corresponding convex surface of the two stationary lenses.

Furthermore, the following symbols will be used:

N is the number of the facets of the polygonal prism;

$x$ is the angle between the optical axis and the normal to the prism facet in any position of the rotating polygon;

H is the full image height, i.e. the length of the film per frame.

Using these symbols, the linear component of the parallel displacement of the image is given by the following formula:

$$\frac{HN}{2\pi}x=\left(\frac{T^1}{n_1^1}+\frac{T2}{n_2}+T^3\right)(n_1-1)x \qquad (1)$$

This formula is precise within close limits of a minor correction due to the small average value of the non-linear component of the image movement. The effect of non-linearity on the image formation is negligible if the number of prism facets is at least twelve. This is based on the possibility of choosing thickness values $T_1$, $T_2$, $T_3$ to the effect that the refracted images coincide for three different positions of the same prism facet. One of these three positions is given by $x=0$, in which case the optical axis is perpendicular to the prism facet; the two other positions are symmetrical to the first one, and may be defined by the $$\text{angle } x=\frac{\pm\pi}{N}$$

In this way, the optical effect of the average value of the non-linear term in the image displacement is eliminated by a corresponding minor adjustment in the thickness values in equation (1). The correcting wedge or wedges, as described in connection with Fig. 1 and 2, compensate for small variations in the length H, i.e. for film shrinkage, as well as for the small average value of non-linearity. Consequently, Equation 1 is a correct design formula, in which H means the length per frame for unshrunk film, and the thickness values are related to the corresponding position of the correcting wedges.

According to Equation 1, both shrinkage compensation and compensation for average non-linearity can be achieved generally by corresponding small changes in the thickness of any one or of several of the optical media. The correcting wedges according to Figs. 1 and 2 increase $T_2$ and decrease $T_3$ with the same amount for shrunk film. Other devices, for changing either the air gap $T_3$ alone, or the glass thickness $T_2$ alone, are described in later paragraphs. It has to be noted that the number of plane-parallel inner components is not limited in principle, so that the thickness $T_2$ of a single component with the refractive index $n_2$ may be replaced by the corresponding values of several plane-parallel inner components.

The rotational chromatic aberration, i.e. the length of the vertical spectrum produced by the rotation of the polygonal prism, is the differential of the displacement Formula 1:

$$\left[T_1\frac{\delta n_1}{n_1^2}+T_2\left(\frac{\delta n_1}{n_2}-\frac{n_1-1}{n_2^2}\delta n_2\right)+T_3\delta n_1\right]x \qquad (2)$$

in which $\delta n_1$ and $\delta n_2$ are the respective dispersion values for the optically utilized spectrum. The periodically changing values (2) of the length of the vertical spectrum can be minimized by suitable choice of the two (or more) glass materials and their thicknesses.

The air equivalent of the length of the total optical path through the composite polygonal prism system is:

$$\frac{T_1}{n_1}+\frac{T_2}{n_2}+T_3=\frac{HN}{2\pi(n_1-1)} \qquad (3)$$

In the case of a design according to Figs. 1 and 2 the following condition must be fulfilled:

$$T_1+T_2+T_3<\frac{HN}{\pi} \qquad (4)$$

which means verbally that the polygon periphery must fit within the sprocket periphery.

In other design cases, different from Figs. 1 and 2, involving reflecting prisms as specified in later paragraphs, the condition (4) has to be replaced by the following one:

$$T_1+T_2+T_3>\frac{HN}{\pi} \qquad (5)$$

Concerning the permissible limits, there is a difference between the two inequalities (4) and (5). It is permissible to keep a very small difference, e.g. 1 or 2 millimeters, between both sides of (4). However, in design cases involving reflecting prisms, to which the inequality (5) has to be applied, the sum of the thicknesses of all optical media must be substantially larger than the sprocket diameter.

Equation 3 is of particular importance if, for a given number N of the prism facets, the largest possible aperture for the image forming beam is wanted. The largest possible aperture angle through the composite polygonal prism system is obtained with the shortest value (3) of the air equivalent of the length of the total path. As shown by Equation 3, the equivalent path length is independent of the refractive indices of the inner glass components, and depends only upon the refractive index of the rotating polygonal component. The path length (3) for $n_1=1.5$ is 60% longer than for $n_1=1.8$, which latter value represents one of the highest refractive indices among presently available optical glasses. Consequently, the largest beam aperture can be secured when the hollow polygonal ring is made of high index glass. With refractive indices between 1.7 and 1.8 there are glasses with high dispersion or with low dispersion available. The latter material is suitable for the polygonal ring and the two (cylindrical) lenses, while high index high dispersion glass can be used for the inner components, including the compensating wedges. Such a design follows the principle illustrated by Figs. 1 and 2, and is satisfactory for various practical uses of the new motion picture apparatus. However, in special cases which may require perfect achromatism, the vertical rotational spectrum should be reduced much more than it is possible with the described combination of high index glasses with low and high dispersion. Another drawback appears with the yellow color of the highest index optical glasses. In this respect, the thickness is of decisive importance, and calculation shows that almost the whole space within the polygonal ring has to be filled with such high index medium.

According to the invention, a high index polygonal ring can be used so that the prismatic aberrations in general, and the vertical spectrum in particular, become sufficiently corrected, and also the thickness of the total amount of glass substantially reduced. This is achieved by placing a plane-parallel plate (e.g. plate 28) of very high index and high dispersion into the cavity of the hollow polygonal ring. This plane-parallel plate is made of a refracting material of much higher index and dispersion than the presently available optical glasses. Such a suitable optical material is rutile crystal, i.e. $TiO_2$, which is obtained synthetically in a known manufacturing process. Rutile is birefringent, but a plane-parallel plate cut perpendicularly to the "c" axis is free of birefringence. The refractive index of the ordinary ray is 2.6, and the dispersion surpasses many times the dispersion of high index rare-earth glasses, and even the dispersion of the densest flint glasses. With these optical properties, the vertical spectrum (2) can be eliminated if suitable thicknesses of $TiO_2$ and glass are applied in the design. The polygonal ring, the two stationary (e.g. cylindrical) lenses, are made of high index glass of low dispersion, while for the compensating wedges high-index high dispersion glass is more preferable. The rutile ($TiO_2$) plate as an inner component may be placed, e.g. cemented, between one of the plane-convex cylindrical lenses and a stationary (i.e. not adjustable) wedge component. The plane-parallel air thickness $T_3$ has to be designed in consideration of the Formulae 2, 3, 4.

Apart from the rotational vertical spectrum, prismatic astigmatism and coma appear periodically with the rotation of the polygonal prism. These aberrations are corrected by the just described design, incorporating rutile plate, as follows: The rotational astigmatism is diminished by the air gap $T_3$, and the rotational coma is diminished by the rutile plate.

The optical aperture of a non-intermittent motion picture apparatus, incorporating a rotating polygonal prism, is determined by the ratio of the area of a prism facet to the air equivalent value of the optical path. The latter is given by Equation 3, and has the smallest value for polygons with highest refractive index. A further increase of the beam aperture, i.e. of the ratio of the prism facet area to the air-equivalent optical path would be possible with an increased area for the prism facet. As the height of the prism facet is limited by the sprocket dimensions, into which the polygonal prism must fit, an enlarging of the facet area would only be possible by lengthening the prism facet parallel to the rotation axis of the polygonal prism. Such a possibility is, however, not given with the design based on the principle, as illustrated by Figs. 1 and 2.

Fig. 3 shows the basic principle of another embodiment of my invention, the purpose of which is to enlarge the beam aperture "horizontally" i.e. in planes parallel to the rotation axis. The plane of Fig. 3 contains both the optical axis of the lens, and the rotation axis of the polygonal prism. The relevant characteristics of the new design can be shown in this section containing both axes, while in elevation, i.e. in a plane parallel to the optical axis and at right angles through the rotation axis, nothing fundamentally new would appear in comparison to Fig. 1. In Fig. 3 all other parts of the system except the polygonal prism, and the lens, have been omitted, as the omitted parts are not affected by the change in design. The polygonal prism 17*a* shown on Fig. 3 is much longer in the direction of its rotation axis than in the case of Figs. 1 and 2. The film 19 in Fig. 3 is guided around the periphery of the polygon by a single sprocket disc 15, which is fitted on the side of the polygonal prism. There is really no need for another sprocket disc, and indeed 16 mm. sound films have only a single row of perforation holes. In order to provide sufficient support for the film during the movement, the diameter of the circumscribed circle through the polygon edges may be equal to the sprocket diameter, or alternatively, the former may be somewhat smaller than the latter. In the cylindrical cavity of the polygonal prism the following stationary optical components are utilized:

Two plane-convex cylindrical lenses 26*a* and 27*a*, the latter being substantially as long as the polygonal prism along the rotation axis. The rhomboid prism 54 has two parallel total-reflecting plane surfaces 55 and 56. However, it is not necessary to make this rhomboid prism as a single piece. For instance, two rectangular prisms, suitably arranged, may fulfill the same purpose as a solid rhomboid prism. Furthermore, the cylindrical lens 27*a* may be composed of a thinner plane-convex cylindrical lens and of a plane-parallel plate, both having made of different refracting material.

The advantage of this device is that the optical aperture along the rotational axis of the polygon, i.e. in "horizontal" direction, is much larger than the width of the film. (Of course, the aperture in "vertical" direction is limited in this case too by the height of the film frame.) The enlarged aperture means higher light efficiency, which is particularly needed in the case of 16 mm. film, as compared with 35 mm. film, if the apparatus has to be used for image formation from cathode-ray screens of given size. The large aperture projection lens 42*a* (or camera lens, as the case may be) covers the whole "horizontal" width of the polygonal prism.

The greater axial dimension of rotating prism 17*a* and cylindrical lens 27*a* as compared to the reduced axial dimension of prism 26*a*, accommodates the convergence of the light rays travelling from lens 42*a* to the film 19. Such convergence is indicated by light rays 24*a* in Fig. 3, up to the point where the beam meets the rhomboid prism 54. The continued path of the beam is indicated only by the center line thereof.

Figure 3A:
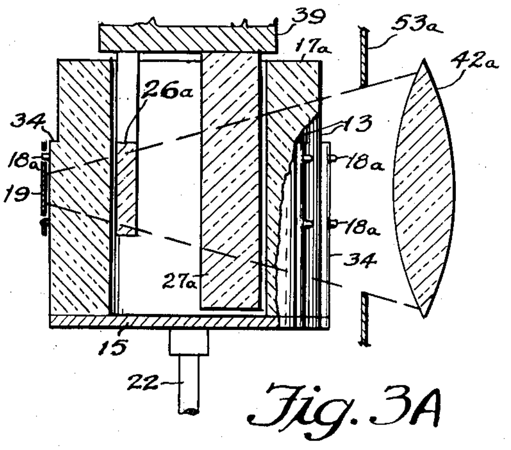
Fig. 3A is a sectional view, partially in side elevation, of a further modified form of the invention.

Fig. 3A shows another embodiment of the invention, which shares with the apparatus of Fig. 3 the advantage of a large horizontal aperture. This modified device does not contain reflecting prisms, and the stationary optical components in the cavity of the polygonal prism are similar to those shown in Figs. 1 and 2. The polygonal prism has to be made long enough in the direction of its rotation axis.

The embodiments of the invention which provide for transmitting a light beam of large aperture, such as shown by Figs. 3 and 3A, may be used in a different way, as compared with the case of Figs. 1 and 2, in the following respect:

In the case of narrow beam aperture, as in Figs. 1 and 2, no frame or gate is needed for limiting the illuminated area on the film. However, the lens aperture has to be limited vertically to the size of a prism facet, e.g. by a rectangular stop (e.g. stop 53 of Fig. 1) positioned between the lens and the rotating prism 17. The case with large beam aperture is compatible with a similar provision, but is not restricted to it. The alternative is to keep open the aperture of the large lens so that it views three prism facets, e.g. by positioning a large rectangular stop (e.g. stop 53*a* of Fig. 3A) between the lens and the polygonal prism. But doing so, a frame or picture gate is necessary for limiting the illuminated area to precisely one frame of the film. A stationary gate can be used behind the film in the case of projection or film scanning. However, for camera purposes a gate behind the film would be useless, while nothing could be positioned between the film and the polygonal prism. In such a case but even for projection and scanning a rectangular limitation of the aperture of the cylindrical lens 26*a* in Fig. 3A is sufficient to function as a picture gate. Due to the thickness of the polygonal ring, the optical limitation on the film is not sharp, but this is rather an advantage, compared with the difficulty to provide a sharp cut gate of precise height behind the film.

The correcting wedges for shrinkage compensation may be incorporated into any of the stationary optical components referred to above. Also it is irrelevant from the point of view of optical performance, which of the internal components is made of the highest index material. E.g. if rutile crystal is used, it is convenient to make two rectangular prisms and to cement them together so that a rhomboid prism is obtained, and this rutile component is placed with its "*c*" axis parallel to the optical axis.

The optical construction according to Figs. 3 and 3A have the advantage of a larger beam aperture, i.e. increased light efficiency, as compared to the device shown by Figs. 1 and 2, as well as in comparison with the following different embodiments of the invention.

Figure 4:
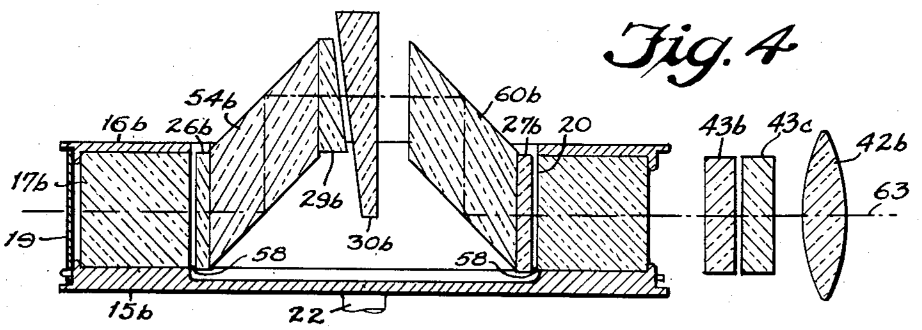
Fig. 4 is a sectional view in the common plane of the optical and rotational axes, of a further modified form of the invention.

Fig. 4 shows a further embodiment of the invention in a section containing the optical axis and the rotation axis. In this case the hollow polygonal prism can be made of any refractive material, without setting a lower limit to the value of the refractive index. That means a complete freedom in choosing the material of the polygonal component, while in the case of Figs. 1 and 2 low index crown glass (or plastics) cannot be used. The film 19 is guided on the periphery of the sprocket discs 15*b* and 16*b*, between which the polygonal prism 17*b* is sandwiched. The sprocket disc 15*b* is rotated by a shaft 22. In the cavity of the polygonal prism 17*b* stationary optical components are arranged. The inner surface 20 of the prism 17*b* is shown to be cylindrical in Fig. 4, but other rotational surfaces may be used. Between the cylindrical surface 20 and the plane-convex cylindrical lenses 26*b* and 27*b* narrow air menisci 58 of preferably zero lens power are formed. The two rhomboid prisms 54*b* and 60*b* are made preferably of higher index glass than the polygonal prism. Between these two rhomboid prisms at 29*b*, 30*b* the shrinkage correcting wedges may be arranged. The lens 42*b* is either a projection lens or a camera lens, according to the purpose of the device. A light ray entering the optical system along the optical axis follows the path 63. At 43*b*, 43*c*, a re-focusing wedge pair is shown.

Figure 5:
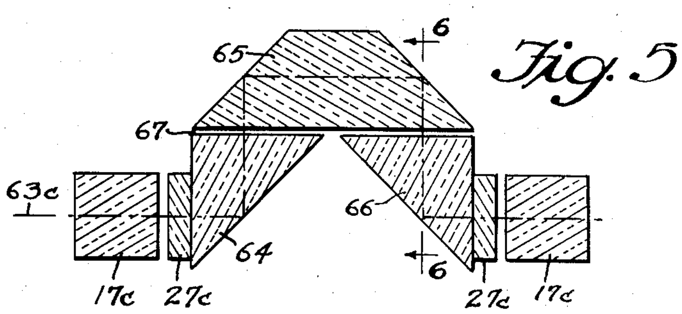
Fig. 5 is a sectional view in a similar plane, of another modified form of the invention.
Figure 6:
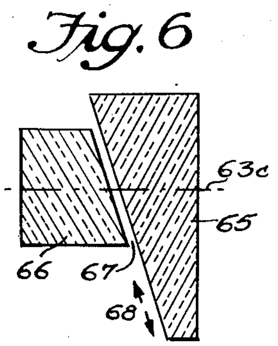
Fig. 6 is a transverse sectional view of the same taken on the line 6—6 of Fig. 5.

A similar light path through the optical system is maintained in another embodiment of the invention according to Fig. 5, which is a section containing the optical axis and the rotation axis. Instead of the two rhomboid prisms of Fig. 4, in Fig. 5 there are three prisms of rectangular cross section 64, 65, 66. The cylindrical lenses 27*c* and the polygonal prism 17*c* are also shown in Fig. 5, but the film with the sprocket discs, as well as the projection lens have been omitted, as they are arranged the same as in Fig. 4. Between the prisms 65 and 66, and between 65 and 64, a narrow oblique air gap 67 is maintained, so that the prism 65 is displaceable along an oblique path, roughly perpendicular to the plane of Fig. 5, leaving the air gap with constant thickness. This is shown in Fig. 6, the plane of which is perpendicular to the optical axis, and contains the path of a ray 63*c* entering the optical system along the optical axis. Compensation for film shrinkage is effected by a corresponding displacement of prism 65 in the direction of the arrows 68, so that the optical path in glass is correspondingly changed, while the air gaps remain constant. Refocusing, after (or simultaneously with) adjusting the prism 65 for shrinkage, can be achieved by a pair of wedges (such as the wedges 43, 44 of Fig. 2) forming a plane-parallel plate of variable thickness between the polygonal prism and the projection lens. The oblique air gaps in this external wedge pair, and between the prisms 64, 65 and 65, 66, can be oriented so that their optical aberrations, such as prismatic astigmatism, become compensated.

Figure 7:
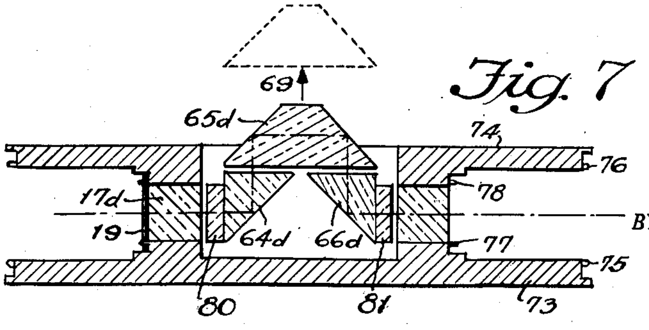
Fig. 7 is a sectional view of another modified form of the invention.

Finally, Fig. 7 shows again another embodiment of the invention, which differs from the device of Figs. 5 and 6 first of all in that respect that the three rectangular prisms 64*d*, 65*d*, 66*d* in Fig. 7 are truly rectangular without oblique surfaces. In this case the compensation for film shrinkage is effected by displacing the rectangular prism 65*d* in a direction parallel to the rotation axis of the polygon, as indicated by arrow 69 and the dotted line showing. Apart from this, Fig. 7 represents quite a unique embodiment of the invention, in that the apparatus can be used with motion picture films of different standards. For instance, one and the same film apparatus incorporating the principles illustrated in Fig. 7 may be used for the projection of 16 mm. and of 8 mm. film, or another apparatus for 16 mm. and for 35 mm. film. The sprockets 73 and 74 are made so that they can carry a film of major frame size (e.g. 16 mm. film) on the outer periphery 75 and 76. The inner periphery 77 and 78 is provided for the film of minor frame size (e.g. 8 mm. film). The polygonal prism 17*d* is fitted within the periphery of the inner sprocket diameter. In the e.g. cylindrical cavity of the polygonal prism 17*d* the stationary components are mounted, such as two plane-convex cylindrical lenses 80 and 81, and the three rectangular prisms 64*d*, 65*d*, 66*d*, already mentioned. This position of the displaceable rectangular prism 65*d*, close to the two other rectangular prisms 64*d* and 66*d*, as shown in Fig. 7, is provided for the case of using a minor size film guided around the inner sprocket periphery 77—78. For the major size motion picture film the optical path length through the composite polygonal prism must be correspondingly increased, in order to achieve the optical immobilization for the large film, which is guided around the outer periphery 75—76 of the sprockets. Thus the rectangular prism 65*d* must be moved out to a predetermined position 69, leaving a corresponding air distance from the two fixed prisms 64*d* and 66*d*.

The rectangular prism may be made of rutile, the "*c*" axis being perpendicular to hypothenuse; actually two half-sized rectangular prisms cemented together would fulfill the same purpose.

The same projection lamp and condenser system (not shown in Fig. 7) may be used for either of the two film sizes. The projection lens (not shown in Fig. 7) may be different for the two film standards.

Generally, all the described embodiments of the invention, and all other possible forms of the optical image immobilizer based on the invention, can be used for various purposes, such as:

(1) projection of motion picture film,
(2) television film scanning, particularly with the flying spot method, (3) motion picture film camera, such as particularly for taking motion pictures from television receiver screen or from radar screen,
(4) high-speed motion picture photography.

In addition to the already described embodiments of the invention, its use for the purpose of a high-speed motion picture camera may involve some particular technical provisions, which are explained as follows:

All known high-speed film cameras of the rotating polygonal prism (or rotating plane-parallel plate) type have a common feature in their mechanical design, which is that the film transport at the place of exposure is geared to the prism rotation. With respect to the necessary highest rate of rotation it is of particular interest to simplify the mechanical properties of high-speed cameras, even by means of introducing a more complicated optical design according to the principle of the composite polygonal prism. It is desirable, without doubt, to avoid any gearing between prism rotation and film movement at the place of exposure, exactly where such a gearing is operated in all presently known high-speed motion picture cameras. The precise position of the film relatively to the prism facet during the exposure can be maintained much better with a single rotating unit, serving the double purpose of mechanical movement of the film, and optical displacement of the image. Such a single rotating unit has to incorporate the rotating prism into a film sprocket, which is exactly the case with the invention, the use of which for the purpose of a film camera with continuous exposure has already been mentioned generally, and for the special purpose of taking motion pictures from television or radar screen. However, a continuous exposure is not necessary, even may not be desirable if motion pictures have to be taken from nature and not from a scanning pattern on television or radar screen. Consequently, the problem of camera shutter arises with the use of the invention for the purpose of high-speed photography.

In conventional high-speed film cameras the shutter effect is achieved by black strips laid around the edges of the polygonal prism (or plate). However, this provision is only compatible with a design which can easily provide a substantial distance between prism and film at the place of exposure. Such a distance is given naturally, if there is a gearing between prism rotation and film movement at the place of exposure.

Figure 8:
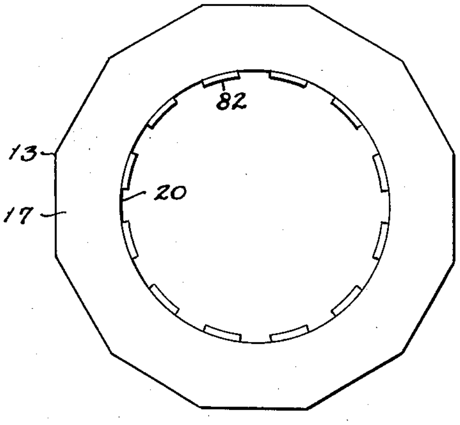
Fig. 8 is an end view of a modified form of the rotating annular optical component, for high speed camera use.

Referring now to Fig. 8: Shutter strips around the periphery of the polygonal prism, of this invention, united with a film sprocket as a single rotating unit, cannot be utilized as such black strips would limit the frame height, due to the close position of prism facet and emulsion during exposure. According to the invention, any required limitation of the exposure time below the frame period can be secured by attaching black shutter strips 82 on the cylindrical inner surface 20, each strip being arranged opposite and parallel to a prism edge, as shown in Fig. 8 (omitting all other optical components). Thus the thickness of the polygonal ring provides a sufficient distance between the shutter strips and the emulsion, so that the shutter strips do not limit the frame height.

Another means for limiting the exposure time is, according to the invention, given by a suitable limitation of the vertical aperture of the stationary optical components in the cavity of the polygonal prism.

Figure 9:
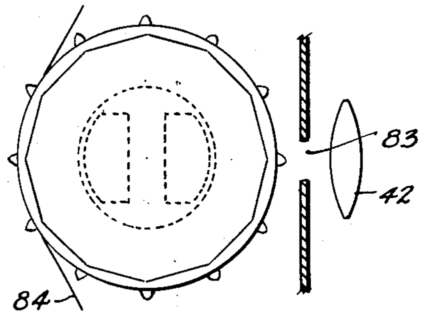
Fig. 9 is an end view of a further modified form of the invention, also for high speed use, with an apertured light screen shown in cross section.
Figure 9A:
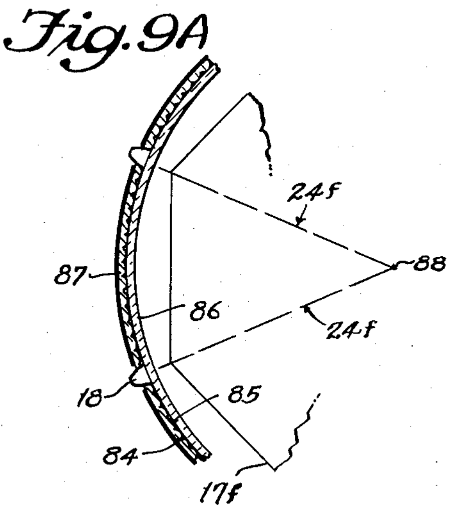
Fig. 9A is a detailed sectional view of the apparatus of Fig. 9, showing the use of lenticular film.
Figure 9B:
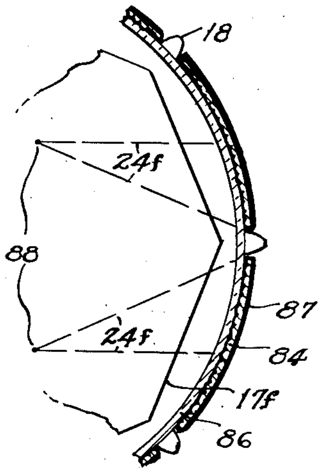
Fig. 9B is another detailed sectional view of the same, with the parts in different relative position.

As shown in Fig. 9, the invention makes possible a novel way of using the polygonal image immobilizer for motion picture camera purposes in general, and for high-speed photography in particular. This novel application does not involve any shutter strips at all, so that the exposure is continuous without any interruptions. The only aperture limitation is applied to the vertical aperture 83 of the camera lens (Fig. 9), so that the virtual image of this horizontal slit aperture through the rotating prism appears to move up and down. Instead of an ordinary film, a lenticular film 84 has to be used, on the celluloid side of which narrow cylindrical lenses 85 are embossed along the width of the film (i.e. the cylindrical lenses are directed at right angles to the film length). The film is laid with the lenticulated side on the periphery of the polygon-sprocket (shown in this instance as a tubular cylindrical shell 86 carrying sprocket teeth 18, and with a solid polygonal prism 17f fixedly mounted therein) so that the curvature of this film path causes a continuous change of the incidence angle of the light coming from the horizontal lens slit through the rotating prism onto the cylindrical lenses, and focused by the latter through the film base onto the emulsion 87. The light rays 24f in this case are radiated through the film from the virtual image 88 of slit 83 which shifts in accordance with the shift in the position of the prism with reference to the optical axis (as shown in Figs. 9A and 9B respectively). During the exposure of a single frame, the combined action of the movement of the lenticular film along the sprocket periphery and of the movement of the virtual image of the lens slit (Figs. 9A, 9B) produce the effect, that subsequently different parts of the narrow emulsion area are exposed behind each cylindrical lens. That means that each frame will comprise a continuous exposure sequence juxtaposed behind each narrow cylindrical lens, so that a single film frame contains several consecutive frames of much shorter exposure time than the frame period. The number of these consecutive frames, taken on a single film frame, can be defined by, or at least related to, the vertical aperture of the lens slit and the resolution of the emulsion.

A lenticular film taken with high speed or low speed in the described manner, can be projected by a non-intermittent projector of the same kind. The optical device shown by Figs. 1 and 2 is suitable both for camera and projector purposes. A particular application of the invention is concerned with motion picture photography at standard film rate, e.g., for amateur purposes, offering the advantage that only a few frames per second, no more than 5 frames per second, or even less, are needed, as each film frame contains a sequence of several (really continuous) consecutive exposures.

At a suitable distance in front of the camera lens of such a continuous motion picture camera a field limiting frame may be placed, the purpose of which is to limit the vertical extension of the exposure area on the emulsion. This provision is intended for the case of taking motion pictures from nature, but it is unnecessary in the case of photographing a luminous scanning pattern on television receiver or radar screen.

Figure 3B:
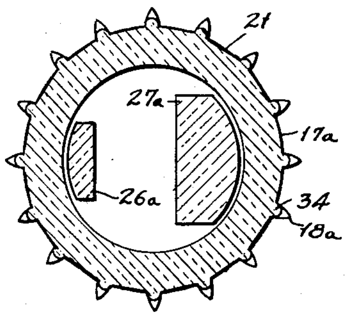
Fig. 3B is a transverse sectional view of the optical unit of Fig. 3A.

Figs. 3A and 3B illustrate how the sprocket and annular prism may be constructed as an integral unit, with sprocket teeth 18a being constructed integrally with ribs 34, which in turn are constructed integrally with prism 17a being disposed along the facet-dividing edges 13 thereof.

The word "image" as used in the claims is defined to include, for example, an area which is in fact dark at any given instant of time except for a particular spot of light, such as may result from the operation of a flying spot scanner or cathode ray tube.

I claim:

1. In continuous motion picture transmitting apparatus, in combination with a film drive sprocket, an annular prism rigid with and arranged for rotation with said sprocket and concentric therewith, said annular prism having a cylindrical inner face and a plurality of peripheral facets cooperatively defining a polygonal outer surface, each facet having an angular extent corresponding to the dimension of a picture frame of a film lengthwise of the film, and a plurality of optical components disposed within said annular prism, said components including a pair of cylindrical lenses each having a cylindrical face conforming to the curvature of and slightly spaced from the cylindrical inner surface of said annular prism, and at least two of said optical components being separated by an air space functioning to increase the lateral displacement of the light rays passing through said optical components, said optical components including in addition to said cylindrical lenses a pair of wedge shaped prisms, one of which is adjustable transversely of the optical axis of light rays passing through the prisms, for adjusting the width of said air space, thereby to adjust the effective length of the optical axis, said annular prism and optical components being functionally cooperable to transversely displace light beams passing through the prism between two places on opposite sides thereof, one of the places being the location of an object, optically speaking, and the other the location of an optical image of that object, and one of the two places also being the location of successive frames of a film which is travelling with the side of the prism nearest to the frames and is in substantially the same position longitudinally of the prism axis as is said prism, the said frames of film, in the case where they are at the location of the object rather than that of the image, containing the said optical object, the said transverse displacement of the beams being such that, where the object is contained in the transversely travelling film frames, the image thereof will be transversely immobilized, and where the object is not at the location of the film frames, the image will travel transversely in synchronism with the successive frames of film.

2. In continuous motion picture transmitting apparatus, in combination with a film drive sprocket, an annular prism rigid with and arranged for rotation with said sprocket and concentric therewith, said annular prism having a cylindrical inner face and a plurality of peripheral facets having an angular extent corresponding to the dimension of a picture frame of a film lengthwise of the film, and a plurality of optical components disposed within said annular prism, said components including a pair of cylindrical lenses each having a cylindrical face conforming to the curvature of and slightly spaced from the cylindrical inner surface of said annular prism, said sprocket comprising a pair of discs attached to respective axial faces of said annular prism and having sprocket teeth formed on the periphery thereof, one of said discs being in the form of a ring providing an opening registering with the space within said annular prism, said additional optical components projecting into said annular prism through said opening, said annular prism and optical components being functionally cooperable to transversely displace light beams passing through the prism in order to establish between a frame of film in substantially the same position longitudinally of the prism axis as said prism, and an optical field on the opposite side of said prism from the film, a relation in which points in said field are kept optically aligned by said prism with corresponding points in said film frame throughout a given angle of rotary movement of said prism on its axis and a corresponding movement of said film.

3. In continuous motion picture transmitting apparatus, a film drive sprocket, an annular rotating polygonal prism directly rigidly connected to said sprocket in a position coaxial therewith and in substantially the same position longitudinally of the prism axis as are the bodies of successive film frames whose marginal portions are in contact with the sprocket, and an additional optical system at least in part located in the hollow interior of the prism, said annular prism having an inner surface defining a cylinder of circular cross-section and said additional optical system including components at least two of which are in the form of cylindrical lenses disposed within said annular polygonal prism and having respective cylindrical faces conforming to and closely associated with the inner cylindrical surface of said annular prism, at least two of said optical components being separated by an air space for increasing the displacement of light beams passing through the apparatus, said additional optical system including, in addition to said cylindrical lenses, prismatic wedge elements having adjoining parallel wedge surfaces extending diagonally to the optical axis, and means for adjusting one of the wedge elements with respect to the other in the diagonal direction.

4. In continuous motion picture transmitting apparatus, a film drive sprocket, an annular rotating polygonal prism which is directly rigidly connected to said sprocket in a position coaxial therewith, and is in substantially the same position longitudinally of the prism axis as are the bodies of successive film frames whose marginal portions are in contact with the said sprocket, said prism being for creating, by displacement of light beams passing therethrough, a relation between an optical field and a frame of said film on the opposite side of said prism from said field, in which points in said field are kept optically aligned by said prism with corresponding points in said film throughout a given angle of rotary movement of said prism around its axis and a corresponding movement of said film, and an additional optical system at least in part located in the hollow interior of the prism, said annular prism having an inner surface defining a cylinder of circular cross-section and said additional optical system including components at least two of which are in the form of cylindrical lenses disposed within said annular polygonal prism and having respective cylindrical faces conforming to and closely associated with the inner cylindrical surface of said annular prism, at least two of said optical components being separated by an air space for increasing the displacement of light beams passing through the apparatus, said additional optical system including, in addition to said cylindrical lenses, prismatic wedge elements having adjoining parallel wedge surfaces extending diagonally to the optical axis, and means for adjusting one of the wedge elements with respect to the other in the diagonal direction.

References Cited in the file of this patent

UNITED STATES PATENTS

| | | |
|---|---|---|
| 1,204,771 | Hopkins | Nov. 14, 1916 |
| 1,504,314 | Bauersfeld | Aug. 12, 1924 |
| 1,928,088 | Bledowski | Sept. 26, 1933 |
| 1,991,957 | Ranieri | Feb. 19, 1935 |
| 2,125,162 | Heymer | July 26, 1938 |
| 2,139,869 | Traub | Dec. 13, 1938 |
| 2,287,033 | Goldmark | June 23, 1942 |
| 2,287,145 | Stephen et al. | June 23, 1942 |
| 2,288,079 | Fitz | June 30, 1942 |
| 2,344,695 | Goldsmith | Mar. 21, 1944 |
| 2,441,013 | Ehrenhaft | May 4, 1948 |
| 2,508,789 | Harrison | May 23, 1950 |
| 2,515,453 | Korb | July 18, 1950 |
| 2,543,463 | Malm | Feb. 27, 1951 |
| 2,588,740 | Malm | Mar. 11, 1952 |
| 2,622,147 | Condliffe et al. | Dec. 16, 1952 |

FOREIGN PATENTS

| | | |
|---|---|---|
| 517,472 | Great Britain | Jan. 31, 1940 |
| 533,456 | Great Britain | Feb. 13, 1941 |
| 52,866 | France | June 19, 1944 |
| 53,160 | France | Dec. 4, 1944 |
| 1,007,234 | France | Feb. 6, 1952 |
| 234,155 | Switzerland | Jan. 3, 1945 |
| 279,948 | Switzerland | May 1, 1952 |
| 155,243 | Austria | Dec. 10, 1938 |